United States Patent Office 3,567,828
Patented Mar. 2, 1971

3,567,828
ORGANIC COMPOUNDS
Edward Fluckiger, Binningen, Switzerland, assignor to Sandoz Ltd. (also known as Sandoz AG), Basel, Switzerland
No Drawing. Filed Aug. 12, 1968, Ser. No. 751,751
Claims priority, application Switzerland, Aug. 17, 1967, 11,603/67
Int. Cl. A61h 27/00
U.S. Cl. 424—261                                      6 Claims

ABSTRACT OF THE DISCLOSURE

The invention provides a pharmaceutical composition incorporating (a) a reserpine constituent, (b) a dihydroergocristine constituent, and (c) N-(cis-2,6-dimethylpiperidino)-4-chloro-3-sulphamoyl benzamide.

The composition produces a pronounced blood pressure lowering effect and is therefore useful in the treatment of high blood pressure illnesses.

---

This invention relates to a pharmaceutical composition.

The invention provides a pharmaceutical composition incorporating (a) a reserpine constituent, (b) a dihydroergocristine constituent, and (c) N-(cis-2,6-dimethylpiperidino) - 4 - chloro - 3 - sulphamoyl benzamide.

Approximate proportions, by weight, of (a):(b):(c) may be 1:1–20:5–1000, 1:1.5–15:10–500, 1:2–10:20–500, and preferably 1:2–10:20–150.

Reserpine, having the formula $C_{33}H_{40}N_2O_9$, is a chief alkaloid of *Rauwolfia serpentina* Benth. Dihydroergocristine, having the formula $C_{35}H_{41}N_5O_5$, is a hydrogenation product of ergocristine, an ergot alkaloid of the peptide type. The international name "clopamide" is hereinafter used for N - (cis - 2,6-dimethylpiperidino)-4-chloro-3-sulphamoyl benzamide, having the formula $$C_{14}H_{20}ClN_3O_3S$$

A single dose of the pharmaceutical composition may, for example, incorporate the following approximate amounts:

|  | Mg. |
|---|---|
| (A) Reserpine | 0.1 |
| Dihydroergocristine | 0.5 |
| Clopamide | 5.0 |
| (B) Reserpine | 0.1 |
| Dihydroergocristine | 0.5 |
| Clopamide | 10.0 |

The dihydroergocristine and reserpine constituents may be in the form of water-soluble, pharmaceutically acceptable salts thereof, e.g. hydrochlorides, hydrobromides, sulphates, methane-, benzene- or toluene sulphonates. The reserpine constituent, however, is preferably used in free base form, and the dihydroergocristine constituent in the form of its methane sulphonate.

It is to be understood that the pharmaceutical composition of the invention extends to galenical preparations thereof, suitable for enteral or parenteral administration, e.g. tablets, dragées and injectable solutions. In order to produce such medicinal preparations the mixture of active compounds is worked up with the usual organic or inorganic physiologically inert adjuvants. Examples of such adjuvants are: lactose, starch, polyvinyl pyrrolidone, stearic acid, sorbic acid, talcum, methyl cellulose, alcohols and glycerin. The preparations may furthermore contain suitable sweetening and colouring substances and flavourings.

EXAMPLES OF GALENICAL PREPARATIONS (1) Dragées (composition A)

| | |
|---|---|
| Reserpine _____g__ | 0.00010 |
| Dihydroergocristine methanesulphonate ___g [1]__ | 0.00058 |
| Clopamide _____g__ | 0.0050 |
| Methanesulphonic acid _____g__ | 0.00018 |
| Stearic acid _____g__ | 0.0020 |
| Polyvinyl pyrrolidone _____g__ | 0.0050 |
| Talcum _____g__ | 0.0070 |
| Maize starch _____g__ | 0.0080 |
| Lactose _____g__ | 0.09214 |
| Coating mass _____g__ | 0.020 |
| For a dragée of _____g__ | 0.140 |

[1] Corresponding to 0.5 mg. of the free base.

Dihydroergocristine methanesulphonate, clopamide, polyvinyl pyrrolidone, talcum, part of the maize starch and lactose are mixed. This mixture is granulated with an aqueous methanesulphonic acid solution and an alcoholic stearic acid solution. Reserpine and the remainder of maize starch are added to the dried and crushed granulate. The mixture is pressed into kernels which are coated in accordance with known processes.

(2) Tablets (composition B)

| | |
|---|---|
| Reserpine _____g__ | 0.00010 |
| Dihydroergocristine methanesulphonate __g [1]__ | 0.00058 |
| Clopamide _____g__ | 0.010 |
| Yellow orange S _____g__ | 0.00010 |
| Stearic acid _____g__ | 0.0020 |
| Polyvinyl pyrrolidone _____g__ | 0.0050 |
| Talcum _____g__ | 0.0070 |
| Maize starch _____g__ | 0.0080 |
| Lactose _____g__ | 0.08722 |
| For a tablet of _____g__ | 0.120 |

[1] Corresponding to 0.5 mg. of the free base.

Reserpine, dihydroergocristine methanesulphonate and clopamide are mixed with polyvinyl pyrrolidone, talcum, maize starch and lactose. The mixture is moistened and mixed with an aqueous solution of yellow orange S until the colour is evenly distributed. An alcoholic stearic acid solution is subsequently added and the mass is kneaded until it can be granulated. The dried and crushed granulate is pressed into tablets.

The new combination preparation exhibits valuable pharmacodynamic properties while it is generally well tolerated and its toxicity is low. Thus, it produces a pronounced blood pressure lowering effect of long duration which sets in rapidly, in normotonic and hypertonic test animals. The pressoric effect in normotonic rats of the sympathetic transmitters is inhibited, that of adrenalin is inhibited permanently and that of noradrenalin temporarily. Furthermore a mild, but lasting salidiuresis is produced in rats and dogs.

The blood pressure lowering effect of the new combination preparation may, for example, be ascertained in hypertonic rats which have not been narcotized (Grollman hypertonia).

In a first test series with hypertonic rats reserpine, dihydroergocristine and clopamide were administered on 4 consecutive days, individually on the one hand and in combination on the other; a control group was treated with a placebo (inert preparation). The results may be seen in Table I; $\overline{\Delta}$ indicates the average values of the changes in blood pressure observed (in mm. of Hg), $p$ indicates their statistical significance (i.e. the probability of error calculated from the deviations from the average values, with the assumption of a significant difference between the treated group and the control group; the difference is considered significant when $p \leqslant 0.05$).

TABLE I

| Active compounds | Treatment | | | |
|---|---|---|---|---|
| | Once | | Four times | |
| | $\bar{\Delta}$ | p | $\bar{\Delta}$ | p |
| Reserpine, 0.01 mg./kg. s.c. | +4 | 0.505 | +16 | 0.416 |
| Dihydroergocristine, 0.05 mg./kg. s.c. | +8 | 0.264 | −4 | 0.276 |
| Clopamide, 1 mg./kg. p.o. | −7 | 0.422 | −5 | 0.435 |
| Reserpine, 0.01 mg./kg. s.c. plus Dihydroergocristine, 0.05 mg./kg. s.c. plus Clopamide, 1 mg./kg. p.o. | −11 | 0.085 | −22 | 0.001 |

The components, therefore, do not exert a significant influence on the blood pressure when administered individually ($p > 0.05$), i.e. their effects did not differ from those obtained by treatment with a placebo. When, however, the same doses of the three active compounds were administred in combination, a pronounced blood pressure reduction could be observed, which may be considered as highly significant after the fourth treatment ($p = 0.001$, i.e. the probability of error only amounts to 0.1%).

In a second test series with hypertonic rats the combination of reserpine, dihydroergocristine and clopamide was compared in analogous manner with the three possible combinations of two of the individual components. The results may be seen in Table II.

TABLE II

| Active compounds | Treatment | | | |
|---|---|---|---|---|
| | Once | | 4 times | |
| | $\bar{\Delta}$ | p | $\bar{\Delta}$ | p |
| Dihydroergocristine, 0.05 mg./kg. s.c. plus clopamide, 1 mg./kg. p.o. | −11 | 0.239 | −33 | 0.965 |
| Reserpine, 0.01 mg./kg. s.c. plus clopamide, 1 mg./kg. p.o. | −26 | 0.001 | −50 | 0.055 |
| Reserpine, 0.01 mg./kg. s.c. plus dihydroergocristine, 0.05 mg./kg. s.c. | +1 | 0.930 | −35 | 0.805 |
| Reserpine, 0.01 mg./kg. s.c. plus dihydroergocristine, 0.05 mg./kg. s.c. plus clopamide, 1 mg./kg. p.o. | −14 | 0.009 | −65 | 0.006 |

The two-compound combinations dihydroergocristine/clopamide and reserpine/dihydroergocristine, therefore, showed no significant effect on the blood pressure during the entire test period. The two-compound combination reserpine/clopamide produced a significant lowering of the blood pressure after one administration, as compared with the control group, but during the further course of the test the probability of error increased and after 4 administrations amounted to over 5% (i.e. the lowering of the blood pressure can no longer be considered significant). The three-compound combination reserpine/dihydroergocristine/clopamide, however, had a significant antihypertensive effect after one administration and after 4 administrations, whereby the probability of error decreased during the course of the test from 0.9% (after the first administration) to 0.6% (after the fourth administration).

In the tests described above, it can be seen that the blood pressure lowering effect of the new combination preparation clearly surpasses that of the individual components and that of the two-compound combinations.

In the tests described above, it can be seen that the blood pressure lowering effect of the new combination preparation clearly surpasses that of the individual components and that of the two-compound combinations.

The toxicity of the preparation is very low, since the $LD_{50}$ of the active compound mixture is between 5000 and 10,000 mg./kg. p.o. (mice), i.e. a many times higher dose than that required for the lowering of the blood pressure.

The above indicated pharmacodynamic properties make the combination preparation suitable for use in the treatment of warm-blooded animals having various forms of high blood pressure illnesses, particularly the essential and renal hypertonia. A suitable daily dose for larger warm-blooded animals is one in which an average of 0.05 to 0.6 mg. of reserpine, 0.25 to 3 mg. of dihydroergocristine and 2.5 to 60 mg. of clopamide are administered. It is preferred to administer an average daily dose of 1 to 2, optionally 3 of the dragées indicated above (composition A) or tablets (composition B), in milder cases 1 dragée or 1 tablet every second day.

What is claimed is:

1. A pharmaceutical composition suitable for lowering blood pressure comprising as active ingredients thereof (a) reserpine or a water-soluble pharmaceutically acceptable salt thereof, (b) dihydroergocristine or a water-soluble pharmaceutically acceptable salt thereof and (c) N - (cis - 2,6 - dimethylpiperidino)-4-chloro-3-sulphamoyl benzamide, the proportions by weight of said active ingredients (a), (b) and (c) being from 1:2:20 to 1:10:150, and the proportion of said active ingredients (a) and (b) being calculated as the free base.

2. A composition of claim 1 wherein the reserpine is present as the free base.

3. A composition of claim 1 wherein the dihydroergocristine is present in the form of its methane sulphonate salt.

4. A composition of claim 1 wherein the reserpine is present as the free base and the dihydroergocristine is present in the form of its methane sulphonate salt.

5. A composition of claim 1 in unit dosage form containing 0.1 mg. reserpine calculated as the free base, 0.5 mg. of dihydroergocristine calculated as the free base and 5.0 mg. of N-(cis-2,6-dimethylpiperidino)-4-chloro-3-sulphamoyl benzamide.

6. A composition of claim 1 in unit dosage form containing 0.1 mg. reserpine calculated as the free base, 0.5 mg. of dihydroergocristine calculated as the free base and 10.0 mg. of N-(cis-2,6-dimethylpiperidino)-4-chloro-3-sulphamoyl benzamide.

References Cited

UNITED STATES PATENTS

| 2,908,613 | 10/1959 | Martin et al. | 424—212 |
| 3,150,044 | 9/1964 | Stein | 424—212 |
| 3,379,612 | 4/1968 | De Stevens et al. | 424—212 |

OTHER REFERENCES

Chem. Abst., 44, 750d (1950).
Chem. Abst., 67, 42242u (1967).

STANLEY J. FRIEDMAN, Primary Examiner

U.S. Cl. X.R.

424—262, 267